United States Patent
Watanabe et al.

(10) Patent No.: US 10,900,545 B2
(45) Date of Patent: Jan. 26, 2021

(54) CHAIN TENSIONER

(71) Applicant: TSUBAKIMOTO CHAIN CO., Osaka (JP)

(72) Inventors: Masanori Watanabe, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 6 days.

(21) Appl. No.: 16/268,714

(22) Filed: Feb. 6, 2019

(65) Prior Publication Data

US 2019/0257391 A1 Aug. 22, 2019

(30) Foreign Application Priority Data

Feb. 16, 2018 (JP) ................. 2018-025987

(51) Int. Cl.
  *F16H 7/08* (2006.01)
(52) U.S. Cl.
  CPC ............. *F16H 7/0848* (2013.01); *F16H 7/08* (2013.01); *F16H 2007/0806* (2013.01);
  (Continued)
(58) Field of Classification Search
  CPC ........... F16H 7/0848; F16H 2007/0812; F16H 2007/0859; F16H 2007/0893; F16H 2007/0895; F16H 2007/0897; F16H 2007/0889; F16H 7/08; F16H 2007/0806; F16H 2007/0808; F16H 2007/0829; F16H 7/0834; F16H 7/0836; F16H 2007/084; F16H 2007/0853; F16H 7/0829
  See application file for complete search history.

(56) References Cited

U.S. PATENT DOCUMENTS 5,087,225 A * 2/1992 Futami ................. F16H 7/08
                                                                474/110
5,116,284 A * 5/1992 Cho ..................... F16H 7/1236
                                                                474/110
(Continued)

FOREIGN PATENT DOCUMENTS

JP   2002-130401 A   5/2002
JP   2002-235818 A   8/2002
(Continued)

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

To provide a chain tensioner that enables a reduction in the number of parts to be machined, the number of assembling steps, and a reduction in the amount of oil flowing outside, without having to increase the size of the chain tensioner. An inner sleeve, which includes a check valve unit on the side of an oil pressure chamber and a pressure adjusting unit on the outer circumference thereof, is disposed inside a plunger. The inner sleeve includes a base part, a sliding cylindrical part, and a movement restricting part. The pressure adjusting unit includes an annular relief valve that is slidably fitted on the sliding cylindrical part and that makes sliding contact with an inner surface of the plunger, and a relief spring that biases the relief valve toward the movement restricting part. The sliding cylindrical part has a relief hole that communicates with the space inside.

4 Claims, 6 Drawing Sheets

(52) U.S. Cl.
CPC ............... *F16H 2007/0808* (2013.01); *F16H 2007/0812* (2013.01); *F16H 2007/0814* (2013.01); *F16H 2007/0853* (2013.01); *F16H 2007/0859* (2013.01)

(56) References Cited

U.S. PATENT DOCUMENTS

| | | | | |
|---|---|---|---|---|
| 5,707,309 | A * | 1/1998 | Simpson | F16H 7/08 474/110 |
| 5,908,363 | A * | 6/1999 | Suzuki | F16H 7/0848 474/101 |
| 5,913,742 | A * | 6/1999 | Nakamura | F16H 7/0848 474/110 |
| 5,961,410 | A * | 10/1999 | Yamamoto | F01L 1/02 474/110 |
| 6,086,497 | A * | 7/2000 | Fukuda | F16H 7/0836 474/101 |
| 6,383,103 | B1 * | 5/2002 | Fujimoto | F01L 1/02 474/109 |
| 6,745,792 | B2 * | 6/2004 | Koo | F16K 17/105 137/491 |
| 7,618,339 | B2 * | 11/2009 | Hashimoto | F01L 1/02 474/109 |
| 2001/0006917 | A1 * | 7/2001 | Hashimoto | F16H 7/08 474/110 |
| 2001/0007841 | A1 * | 7/2001 | Nakakubo | F16H 7/0836 474/110 |
| 2002/0052259 | A1 | 5/2002 | Nakakubo et al. | |
| 2002/0169042 | A1 | 11/2002 | Kurohata et al. | |
| 2005/0014587 | A1 * | 1/2005 | Konishi | F16H 7/0836 474/110 |
| 2006/0063625 | A1 * | 3/2006 | Emizu | F16H 7/0836 474/110 |
| 2006/0089221 | A1 | 4/2006 | Hashimoto et al. | |
| 2011/0256970 | A1 | 10/2011 | Nakano et al. | |
| 2014/0187367 | A1 * | 7/2014 | Todd | F16H 7/0848 474/110 |
| 2014/0200104 | A1 * | 7/2014 | Kurematsu | F16H 7/08 474/110 |
| 2016/0084359 | A1 * | 3/2016 | Wigsten | F16H 7/0848 474/110 |
| 2017/0138443 | A1 * | 5/2017 | Kurematsu | F16H 7/0848 |
| 2018/0180191 | A1 * | 6/2018 | Shinoyama | F16K 17/196 |
| 2018/0313434 | A1 * | 11/2018 | Watanabe | F16H 7/0848 |
| 2019/0242461 | A1 * | 8/2019 | Watanabe | F16H 7/0848 |

FOREIGN PATENT DOCUMENTS

| | | |
|---|---|---|
| JP | 2002-327810 A | 11/2002 |
| JP | 2006-125430 A | 5/2006 |
| JP | 2011-226534 A | 11/2011 |

* cited by examiner

RELATED ART

CHAIN TENSIONER

BACKGROUND OF THE INVENTION

1. Field of the Invention

The present invention relates to a chain tensioner that includes a tensioner body having a cylindrical plunger bore with an open end, a cylindrical plunger slidably inserted in the plunger bore, and biasing means that is accommodated in an oil pressure chamber formed inside the plunger, such as to freely expand and contract, and that biases the plunger to a front side to which the plunger moves outward.

2. Description of the Related Art

It has been common practice to use a chain tensioner that maintains correct tension of a chain. For example, a chain guide mechanism has been known, which slidably guides, by means of a traveling guide shoe, a drive chain such as an endless roller chain passing over respective sprockets of a crankshaft and a cam shaft inside an engine room, and which uses a chain tensioner to bias a pivoting chain guide having the traveling guide shoe to maintain appropriate tension of the chain.

A chain guide mechanism is configured as shown in FIG. 5, for example, wherein a pivoting chain guide G1 and a fixed chain guide G2 guide an endless timing chain CH passing over a drive sprocket S1 of a crankshaft and a pair of driven sprockets S2 and S3 of cam shafts inside an engine room.

The fixed chain guide G2 is fixed in position in the engine room with two mounting shafts B1 and B2, while the pivoting chain guide G1 is attached such as to be pivotable around the mounting shaft B0 in the plane in which the railing chain CH runs in the engine room.

A chain tensioner 500 presses the pivoting chain guide G1 and thereby maintains the tension of the timing chain CH at an appropriate level as well as reduces its vibration.

One known chain tensioner 500 used in such a chain grade mechanism includes, for example, as shown schematically in FIG. 6, a tensioner body 510 having a cylindrical plunger bore 511 with an open end, a cylindrical plunger 520 inserted in the plunger bore 511 to freely slide against a cylindrical surface 513 of the plunger bore 511, and biasing means that biases the plunger 520 to a front side, to which the plunger 520 moves outward from the plunger bore 511.

The biasing means is formed by a coil spring 540 accommodated inside a cylindrical recess 521 in the cylindrical plunger 520 and compressed between the plunger 520 and a bottom part 512 of the plunger bore 511.

Oil is supplied from an oil supply hole 514 formed in the plunger bore 511, so that an oil pressure chamber 501 formed between the plunger bore 511 and the plunger 520 is filled with the oil and the plunger 520 is biased outward by the oil. A check valve 550 (schematically shown as a check ball) stops the oil from flowing out from the oil supply hole 514.

As the plunger 520 reciprocates, the oil flows through a small gap between the plunger 520 and the plunger bore 511, and the flow resistance provides the damping effect of slowing down the reciprocal movement of the plunger 520.

In such a chain tensioner, in the event of an excessive tension developed in the timing chain during use, the pressure in the oil pressure chamber will be too high, which could generate noise or vibration, or cause damage to the timing chain.

Chain tensioners provided with a relief valve for relieving pressure when the pressure of the oil pressure chamber reaches or exceeds a predetermined limit to prevent such a situation have been known (see Japanese Patent Application Laid-open Nos. 2002-327810, 2011-226534, 2002-130401, 2002-235818, 2006-125430, etc.).

SUMMARY OF THE INVENTION

In the chain tensioners known from Japanese Patent Application Laid-open Nos. 2002-327810, 2011-226534, etc., a relief valve is provided to the tensioner body via an additional oil passage rather than being disposed inside the plunger bore. Therefore, the chain tensioners themselves are increased in size, and so are the number of parts to be machined and the number of assembling steps.

In the chain tensioners known from Japanese Patent Application Laid-open Nos. 2002-130401, 2002-235818, 2006-125430, etc., a relief valve is disposed inside the plunger thereby avoiding a size increase of the chain tensioners themselves. On the other hand, the internal structure of the plunger is more complex and the number of assembling steps is increased.

Another problem is that, since the oil released by the relief valve flows outside, more oil is consumed, and accordingly the oil pump power needs to be enhanced.

An object of the present invention is to solve these problems and provide a chain tensioner that enables a reduction in the number of parts to be machined and the number of assembling steps, as well as a reduction in the amount of oil flowing outside, without having to increase the size of the chain tensioner.

The present invention achieves the above object by providing a chain tensioner including; a tensioner body having a cylindrical plunger bore with an open end; a cylindrical plunger slidably inserted in the plunger bore; and biasing means that is accommodated in an oil pressure chamber formed inside the plunger, such as to freely expand and contract, and that biases the plunger to a front side to which the plunger moves outward, the plunger including an inner sleeve disposed therein, the inner sleeve including a check valve unit that is provided on a side of the oil pressure chamber and prevents reverse flow of oil into the oil pressure chamber, and a pressure adjusting unit that is provided on an outer circumference thereof and prevents pressure in the oil pressure chamber from reaching or exceeding a predetermined high level. The inner sleeve includes a base part, a sliding cylindrical part provided on the base part on a side of the oil pressure chamber, and a movement restricting part provided on the sliding cylindrical part on a side of the oil pressure chamber. The pressure adjusting unit includes an annular relief valve that slidably fits on the sliding cylindrical part and makes slidable contact with an inner surface of the plunger, and a relief spring that biases the relief valve toward the movement restricting part. The sliding cylindrical part has a relief hole that communicates with a space inside the sliding cylindrical part.

According to the chain tensioner as set forth in claim 1, the inner sleeve includes a base part, a sliding cylindrical part provided on the base part on a side of the oil pressure chamber, and a movement restricting part provided on the sliding cylindrical part on a side of the oil pressure chamber, while the pressure adjusting unit includes an annular relief valve that slidably fits on the cylindrical part and makes slidable contact with an inner surface of the plunger, and a relief spring dial biases the relief valve toward the oil pressure chamber. The pressure adjusting unit can thus be accommodated in a space surrounded by the outer surface of the inner sleeve and the inner surface of the plunger, so that the chain tensioner itself need not be enlarged, nor is there any increase in the number of parts to be machined.

Also, since the inner sleeve functions as an element of the pressure adjusting unit, the number of components is reduced, enlargement of the tensioner is avoided, and the number of pans to be machined and the number of assembling steps can be decreased.

The sliding cylindrical part has a relief hole that communicates with a space inside the sliding cylindrical pan. Since the tensioner is configured such that the pressure is relieved by the pressure adjusting unit via the relief hole toward the side the oil is supplied from, no oil is released to the outside during the pressure relief, and since the pressure difference between the oil pressure chamber and the release side is smaller, the speed at which the pressure adjusting unit returns to its closed state can be increased.

Moreover, even when the pressure adjusting unit is activated before the oil supply is started, such as when starting the engine, pressure is relieved toward the oil supply side. Moreover, the released oil is recovered immediately via the relief hole, so that rattling at the start of the engine can be reduced.

According to the chain tensioner as set forth in claim 2, an end portion is provided on the base part on the side of the oil pressure chamber, the end portion being formed to have a larger diameter than that of the sliding cylindrical part. The end portion provided on the base part on the side of the oil pressure chamber thus functions as a stopper for the relief valve on the release side. When the base part and the sliding cylindrical part are separate parts, they only need to be fined together and no additional stopper needs to be used in combination or processed, whereby the number of process steps can be reduced.

According to the chain tensioner as set forth in claim 3, the base part has a stopper ring that is provided around an outer circumference on a bottom side of the plunger bore and that receives the relief spring. This allows the inner sleeve and the pressure adjusting unit that are united in advance to be assembled into the plunger as one component, whereby the number of assembling steps can be reduced.

According to the chain tensioner as set forth in claim 4, the base part includes a reserve hole that extends through the cylindrical part radially between inner and outer circumferences thereof, which allows the oil to circulate back to the oil reservoir chamber more reliably.

DESCRIPTION OF THE PREFERRED EMBODIMENT

Embodiment 1

Figure 1:
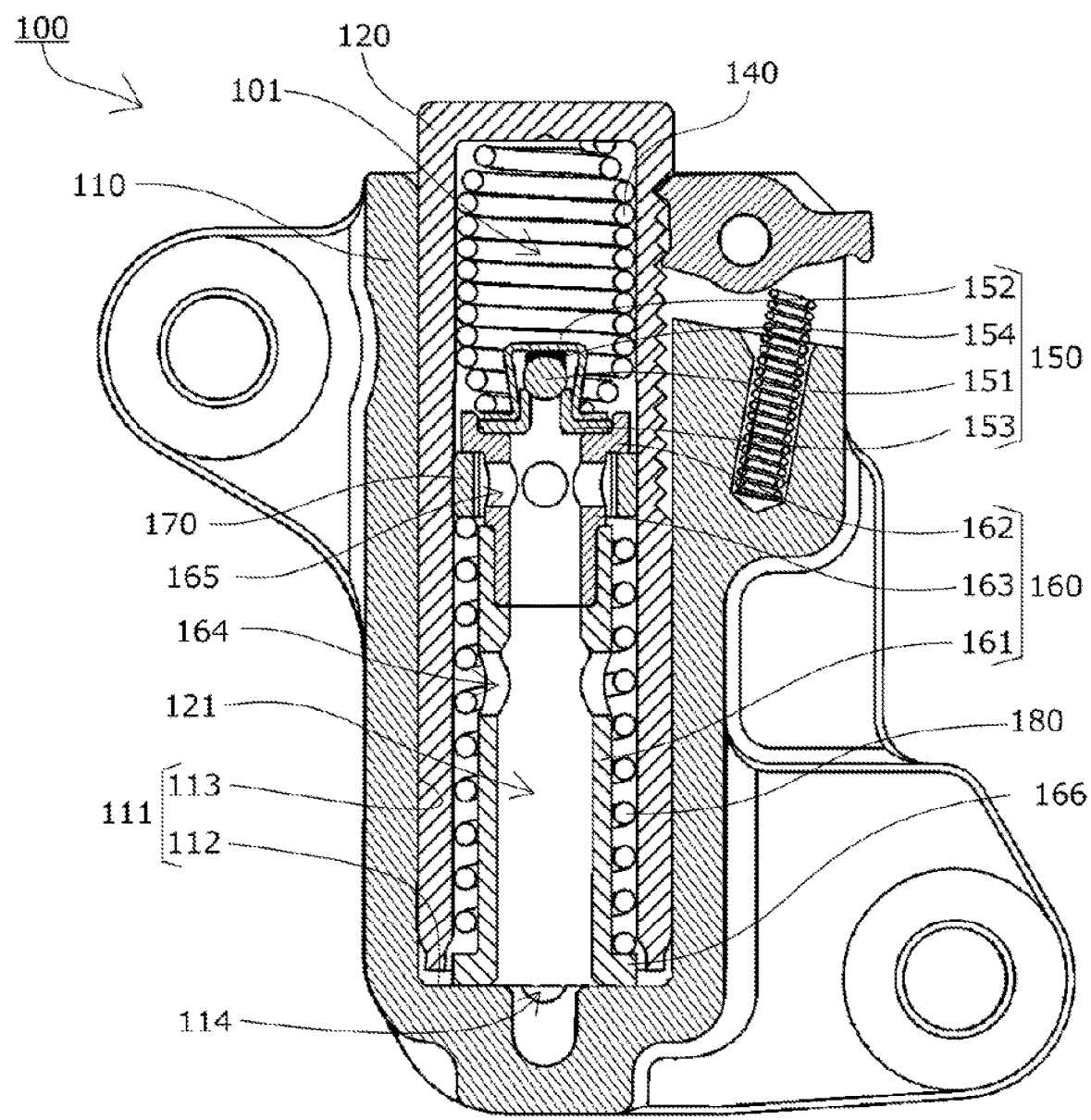
FIG. 1 is a front cross-sectional view of a chain tensioner according to one embodiment of the present invention.
Figure 2:
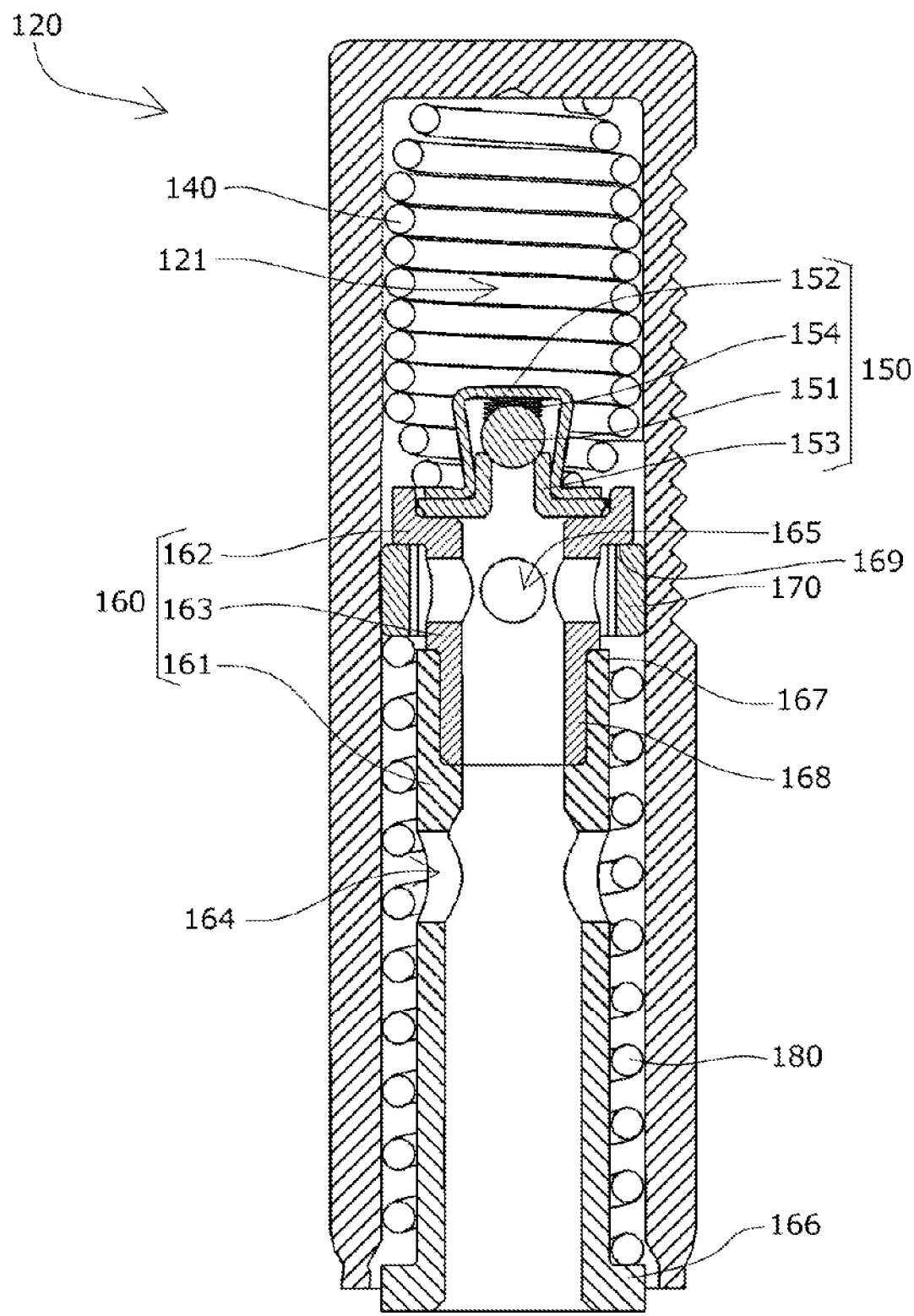
FIG. 2 is a side cross-sectional view of the chain tensioner according to one embodiment of the present invention.

The chain tensioner 100 according to one embodiment of the present invention includes, as shown in FIG. 1 or FIG. 2, a tensioner body 110 having a cylindrical plunger bore 111 with a cylindrical surface 113 and an open end, a cylindrical plunger 120 slidably inserted in the plunger bore 111, and a coil spring 140 that is biasing means that is accommodated in an oil pressure chamber 101 formed inside the plunger 120, such as to freely expand and contract, and that biases the plunger 120 outward.

The plunger 120 includes an inner sleeve 160 disposed therein, the inner sleeve 160 including a check valve unit 150 that is provided on the side of the oil pressure chamber 101 and prevents reverse flow of oil into the oil pressure chamber 101, and a pressure adjusting unit that is provided on an outer circumference thereof and prevents the pressure in the oil pressure chamber 101 from reaching or exceeding a predetermined high level.

An oil supply hole 114 is formed in the tensioner body 110 for supplying oil from a bottom part 112 of the plunger bore 111.

Figure 3:
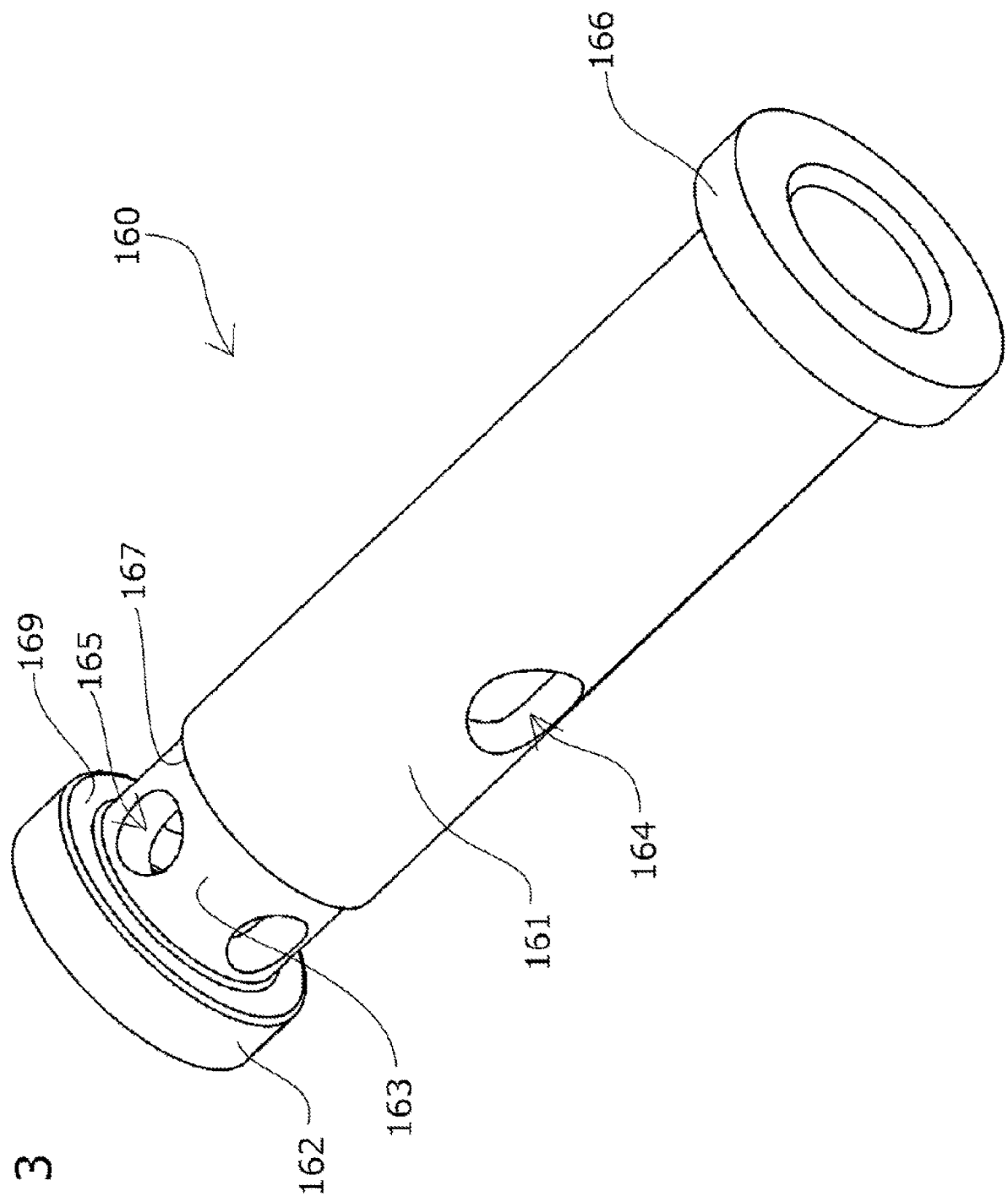
FIG. 3 is a perspective view of an inner sleeve of the chain tensioner according to one embodiment of the present invention.

The inner sleeve 160 includes, as shown in FIG. 2 or FIG. 3, a base part 161, a sliding cylindrical part 163 provided on the base part 161 on the side of the oil pressure chamber 101, and a movement restricting part 162 provided on the sliding cylindrical part 163 on the side of the oil pressure chamber 101. A step at the joint between the movement restricting part 162 and the sliding cylindrical part 163 forms a valve abutment surface 169 for a relief valve 170 to be described later to abut on.

A reserve hole 164 is formed in the base part 161 such as to extend through the inner sleeve 160 radially between inner and outer circumferences thereof, and the sliding cylindrical part 163 has relief holes 165 that communicate with the space inside the sliding cylindrical part 163.

The pressure adjusting unit includes an annular relief valve 170 that slidably fits on the sliding cylindrical part 163 of the inner sleeve 160 and makes slidable contact with the inner surface of the plunger 120, and a relief spring 180 that biases the relief valve 170 toward the movement restricting part 162.

Figure 4:
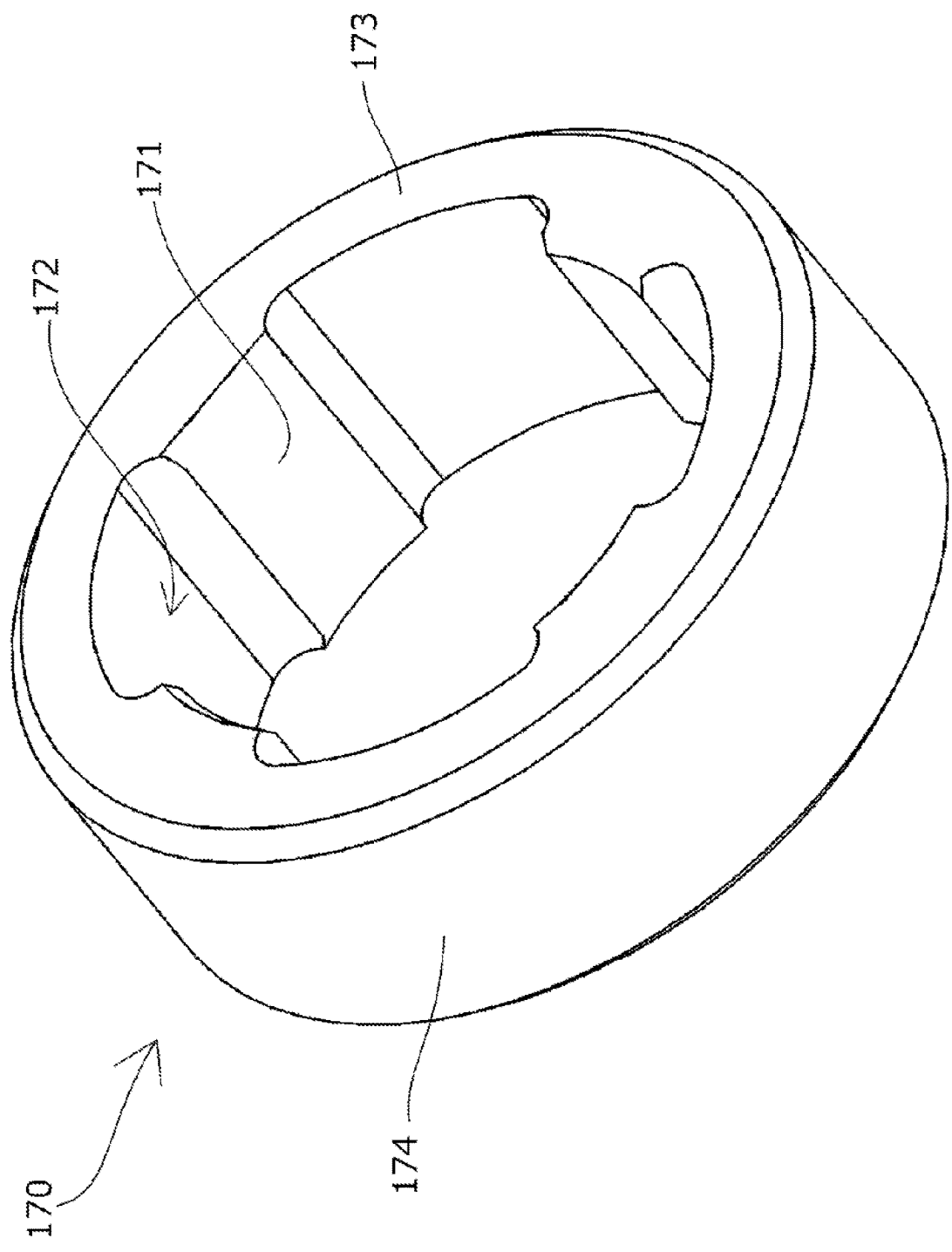
FIG. 4 is a perspective view of a relief valve of the chain tensioner according to one embodiment of the present invention.
Figure 5:
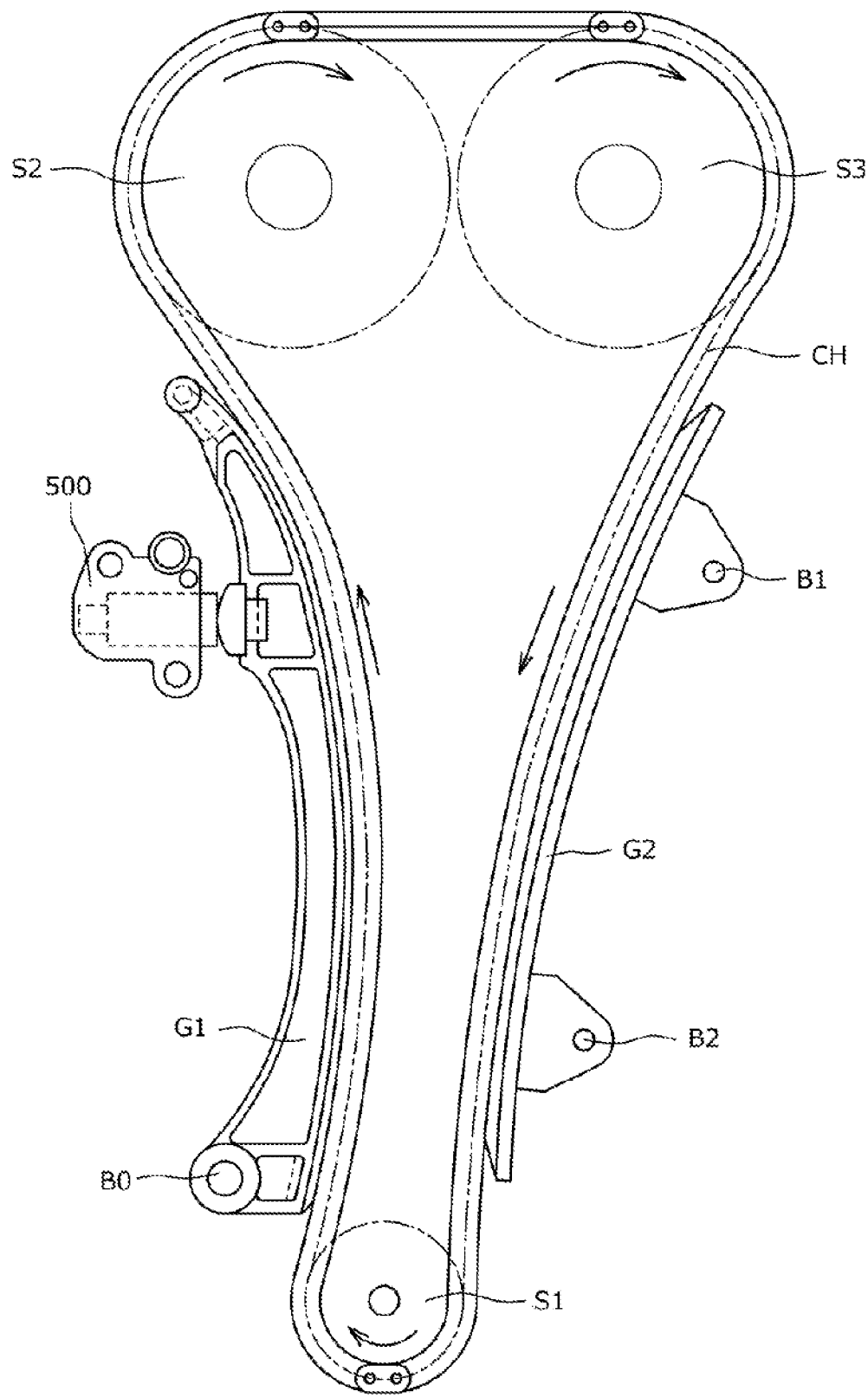
FIG. 5 is an illustrative diagram of the chain tensioner used is a chain guide mechanism of an engine.
Figure 6:
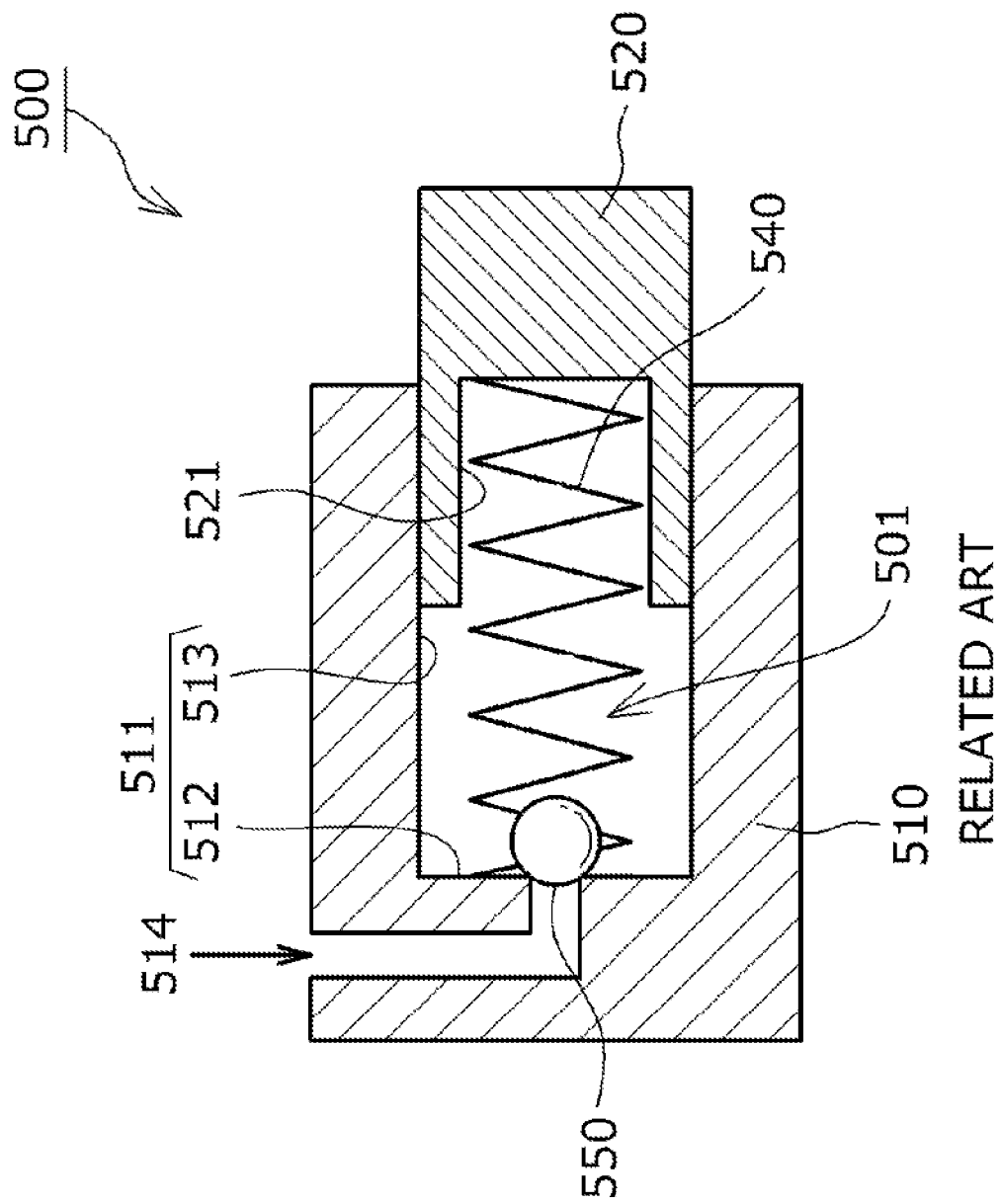
FIG. 6 is a schematic illustrative diagram of a conventional chain tensioner.

The relief valve 170 has an outer circumferential sliding surface 174 that makes sliding contact with the inner surface of the plunger 120 on the outer side, an inner circumferential sliding surface 171 that makes sliding contact with the sliding cylindrical part 163 of the inner sleeve 160 on the inner side, relief grooves 172 that allow the oil to flow to the relief holes 165 on the radially inner side, and a front seal surface 173 that abuts on the valve abutment surface 169 of the movement restricting part 162 of the inner sleeve 160 to seal the oil pressure chamber 101 on the front end face, as shown in FIG. 4.

A stopper ring 166 is formed on the outer circumference at the rear end of the base part 161 of the inner sleeve 160 and receives one end of the relief spring 180.

One end 167 provided on the base part 161, of the inner sleeve 160, on the side of the oil pressure chamber 101 is formed to have a larger diameter than that of the sliding cylindrical part 163 such as to restrict movement of the relief valve 170 toward the rear side.

In this embodiment, a fitting part 168 that fits with one end 167 of the base part 161 on the side facing the oil pressure chamber 101, the movement restricting part 162, and the sliding cylindrical part 163 are formed integrally, so that the inner sleeve can be assembled by fixedly filling the fitting part 168 to one end 167 of the base part 161 on the side facing the oil pressure chamber 101, with the relief valve 170 fitted on the sliding cylindrical part 163 and with the relief spring 180 fitted on the base part 161.

The check valve unit 150 provided at the front end of the movement restricting part 162 of the inner sleeve 160 includes a check ball 151, a retainer 152 holding the check ball 151 inside, a check valve seat 153 that opens and closes as the check ball 151 sits thereon and separates therefrom, and a ball pressing spring 154 that lightly presses the check ball 151 toward the check valve seat 153 inside the retainer 152.

Thus the oil pressure chamber 101 is formed inside the plunger 120 on the front side to which the plunger moves outward, and an oil reservoir chamber 121 is formed inside and outside the inner sleeve 160 on the rear side.

The chain tensioner 100 according to this embodiment is a type known as a ratchet tensioner. The ratchet mechanism may have any known structure and operate as known, and the tensioner need not necessarily be a ratchet type, and so it will not be described in detail.

How the chain tensioner 100 according to one embodiment of the present invention configured as described above operates will be explained.

When the plunger 120 moves outward, the oil that has been supplied from the oil supply hole 114 and held in the oil reservoir chamber 121 pushes up the check ball 151 from the check valve seat 153 and flows into the oil pressure chamber 101.

When the plunger 120 is pressed, the pressure inside the oil pressure chamber 101 rises, whereby the check ball 151 is pressed against the check valve seal 153, and the oil is stopped from flowing out of the check valve unit 150. The pressure the acts to press the relief valve 170 downward against the pressing force of the relief spring 180.

When the pressure in the oil pressure chamber 101 reaches or exceeds a predetermined high level, the relief spring 180 is compressed to cause the relief valve 170 to retract, and as the front seal surface 173 of the relief valve 170 separates from the movement restricting part 162, the pressure in the oil pressure chamber 101 is relieved to the oil reservoir clumber 121 inside the inner sleeve 160 via the relief grooves 172 and relief holes 165.

Even when the pressure adjusting unit is activated before the oil simply is started, such as when starting the engine, the oil is recovered to the oil reservoir chamber 121 inside the inner sleeve 160 immediately after the relief valve 170 has relieved pressure, and therefore, rattling at the start of the engine can be reduced.

The relief grooves 172 may be omitted, and the pressure in the oil pressure chamber 101 at or exceeding a predetermined level may be absorbed by a substantial change in volume of the oil pressure chamber 101 until the front seal surface 173 of the relief valve 170 reaches the relief holes 165.

Grooves or the like that serve as orifices may be provided to any of the front seal surface 173, inner circumferential sliding surface 171, and outer circumferential sliding surface 174 of the relief valve 170, the sliding cylindrical part 163 of the tuner sleeve 160, the valve abutment surface 169 of the movement restricting part 162, the inner surface of the plunger 120, and so on.

As the front seal surface 173 of the relief valve 170 separates from the valve abutment surface 169 of the movement restricting part 162 to relieve pressure from the oil pressure chamber 101, the oil does not flow outside but flows from the oil pressure chamber 101 into the oil reservoir chamber 121 inside the sliding cylindrical part 163 through the relief grooves 172 and relief holes 165.

Part of the oil flows to the radially outer side of the base part 161 in the oil reservoir chamber 121. Since the base part 161 is formed with the reserve hole 164 that extends through the inner sleeve 160 radially between inner and outer circumferences thereof, the outer side of the inner sleeve 160 functions also as part of the oil reservoir chamber 121. Thus the oil that flows out all circulates back to the oil reservoir dumber 121.

When the pressure in the oil pressure chamber 101 reduces to or below a predetermined level, the relief valve 170 is again moved by the relief spring 180 so that the front seal surface 173 sits on the valve abutment surface 169 of the movement restricting part 162, to keep it shut and maintain the pressure inside.

Since the pressure is relieved by the relief valve 170 toward the oil reservoir chamber 121 from which the oil is supplied in this structure, the pressure difference between the oil pressure chamber 101 and the oil reservoir chamber 121 is smaller as compared to conventional structures wherein the pressure is relieved outside, and therefore the speed at which the relief valve 170 returns to its closed state is increased.

In this embodiment, the inner sleeve 160, which configures the oil reservoir chamber 121, and the pressure adjusting unit, can be assembled into one component in advance, by fixedly fitting the fitting part 168 with one end 167 of the base part 161 on the side facing the oil pressure chamber 101, with the relief valve 170 fitted on the sliding cylindrical part 163 and with the relief spring 180 fitted on the base part 161. This way, the number of parts of the tensioner body 110, plunger 120 and so on that need to be machined, and the number of process steps when assembling the chain tensioner 100, can be largely reduced.

For tensioners in which: an oil reservoir chamber is formed inside the plunger on the front side to which the plunger moves outward; a pressure chamber is formed on the bottom side of the plunger bore; and the oil is supplied from the front side of the tensioner body, the pre-assembled unit of the inner sleeve 160 and the pressure adjusting unit described above can be inserted inversely from the way in the above-described embodiment, so that a similar configuration is achieved wherein pressure is relieved by the pressure adjusting unit toward the side the oil is supplied from, to prevent the oil from flowing outside during pressure relief.

While the embodiment described above presents a specific example of the chain tensioner according to the present invention, the chain tensioner according to the present invention is not limited to these examples, and for example, the shapes, positions, sizes, and positional relationships with each other of various constituent parts may be modified in various manners, or variously combined as appropriate.

In the embodiment described above, illustrations in winch the plunger protrudes upwards were used and the plunger was described as being protruded in this direction, but the plunger may be arranged to protrude in any direction in accordance with the mode in which it is used.

It is preferable, in the embodiment described above in particular, to dispose the chain tensioner such that the oil reservoir chamber is located higher than the check valve (opposite to the drawing). The relief valve will then be located higher than the oil pressure chamber and the tensioner can have enhanced robustness with respect to air leak possibilities.

The chain tensioner of the present invention may not necessarily be applied to a chain guide mechanism that uses a traveling guide shoe for slidably guiding a drive chain such as an endless roller chain passing over respective sprockets of a crankshaft and a cam shaft in an engine room, but may also be adopted in applications where the chain is slidably guided directly by the distal end of the plunger.

The tensioner may not necessarily be applied to a chain transmission mechanism but also used for similar transmission mechanisms that use belts, ropes and the like, and can be applied in a variety of industrial fields.

What is claimed is:

1. A chain tensioner comprising: a tensioner body having a cylindrical plunger bore with an open end; a cylindrical plunger slidably inserted in the cylindrical plunger bore; and biasing means that is accommodated in an oil pressure chamber formed inside the cylindrical plunger, such as to freely expand and contract, and that biases the cylindrical plunger to a front side to which the cylindrical plunger moves outward, the cylindrical plunger including an inner sleeve disposed therein, the inner sleeve being located inside an oil reservoir chamber, and including a check valve unit, the check valve unit being provided on an end of the inner sleeve which faces the oil pressure chamber, so as to prevent reverse flow of oil from the oil pressure chamber, and a pressure adjusting unit that is provided on an outer circumference of the inner sleeve and prevents pressure in the oil pressure chamber from reaching or exceeding a predetermined high level, the inner sleeve including a base part, a sliding cylindrical part provided on the base part on a side of the oil pressure chamber, and a movement restricting part provided on the sliding cylindrical part on the side of the oil pressure chamber, the pressure adjusting unit including an annular relief valve that slidably fits on the sliding cylindrical part and makes slidable contact with an inner surface of the cylindrical plunger, and a relief spring that biases the annular relief valve toward the movement restricting part, and the sliding cylindrical part having a relief hole that communicates with a space inside the sliding cylindrical part, wherein oil discharged through the annular relief valve circulates back to the oil reservoir chamber.

2. The chain tensioner according to claim 1, wherein an end portion is provided on the base part on the side of the oil pressure chamber, the end portion being formed to have a larger diameter than that of the sliding cylindrical part.

3. The chain tensioner according to claim 1, wherein the base part has a stopper ring that is provided around an outer circumference of the base part on a bottom side of the plunger bore and that receives the relief spring.

4. The chain tensioner according to claim 1, wherein the base part includes a reserve hole that extends through the base part radially between inner and outer circumferences thereof.

* * * * *